Oct. 27, 1970   J. ULDERUP   3,536,346
BALL JOINT AND METHOD OF MAKING SAME
Filed April 22, 1968

Jurgen Ulderup
INVENTOR.

BY Karl F. Ross
ATTORNEY

United States Patent Office 3,536,346
Patented Oct. 27, 1970

3,536,346
BALL JOINT AND METHOD OF MAKING SAME
Jurgen Ulderup, Hannover, Germany, assignor to Lemforder Metallwaren AG, Lemforde, Germany
Filed Apr. 22, 1968, Ser. No. 723,172
Claims priority, application Germany, Apr. 22, 1967, U 5,607
Int. Cl. F16c 11/06
U.S. Cl. 287—88                8 Claims

ABSTRACT OF THE DISCLOSURE

In producing a ball joint between two relatively displaceable members, such as a crank arm and a rod generally perpendicular thereto, a male coupling element is formed from a plurality of tubes of deformable material successively introduced into the interior of a spherically concave female coupling element, the outermost tube being first deformed against the spherical wall portion whereupon the next tube is similarly deformed against the first tube, and so on, until the composite of nested tubes has a spherical bulge mating with the concavity of the female element.

---

My present invention relates to a ball joint to be used as a coupling between two relatively displaceable members, such as a crank arm and a rod generally perpendicular thereto, which are subject to limited angular excursions from a predetermined relative position. Such couplings are useful, for example, in the steering linkages of automotive vehicles.

The general object of my invention is to provide a ball joint of this type which is of simple construction, as well as an inexpensive process for making such joints without the need for chip-removing machining.

A ball joint according to this invention comprises a female coupling element or socket having a spherically concave bore with an open end or a pair of open ends centered on an axis, an associated male coupling element being formed from a multiplicity of tightly nested tubes which are normally centered on the same axis and have a bulging portion contacting the inner peripheral wall of the socket bore while conforming to the spherical curvature thereof. This bulge can be formed in a very simple way, pursuant to the present improvement, by first introducing the outermost tube and expanding it in a generally radial direction until it makes full surface contact with the spherical socket wall; thereafter, the next-smaller tube is inserted into the expanded outer tube and is similarly expanded, this process being repeated, if necessary, by the use of additional tubes until the composite male element or ball member is strong enough to withstand any peripheral stresses to which it may be subjected during operation and which would tend to flatten the spherical bulge formed therein.

By thus dividing the ball member into two or more tubular constituents which can be individually deformed with relatively little effort, I am able to provide a sturdy coupling with positive interengagement of the two members over any desired arc length and without any need for splitting the socket.

In accordance with a further feature of my invention, the socket may be made from a unitary metallic shell with a plastic liner defining the spherically curved wall thereof, the liner having an integral annular extension which projects axially from the shell and forms a flexible sleeve around an undeformed portion of the nested tubes while gripping the outermost tube under radial clamping pressure. This arrangement allows a limited rocking of the tube nest, and of any rod or other member connected therewith, about the center of the sphere while exerting a certain restoring force which tends to maintain the alignment between the tube axis and the socket axis.

Figure 1:
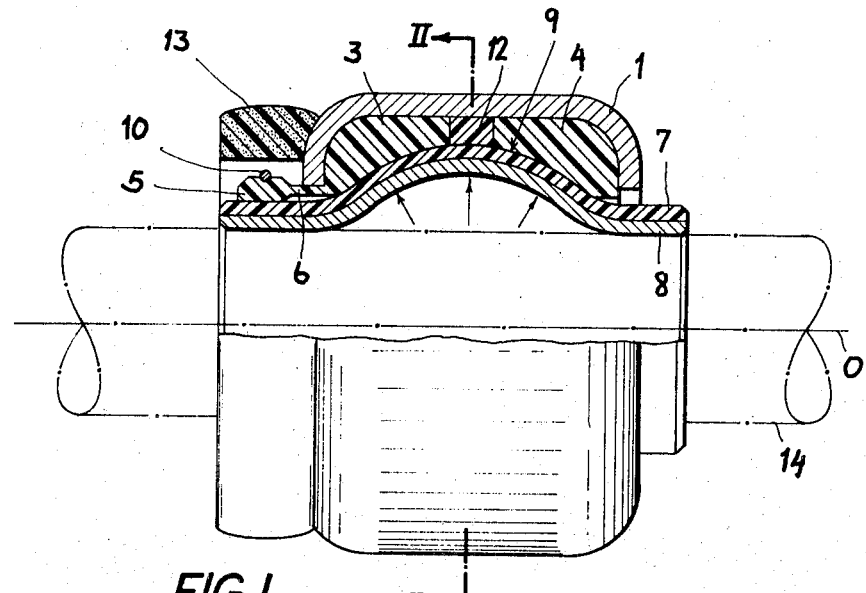
Figure 2:
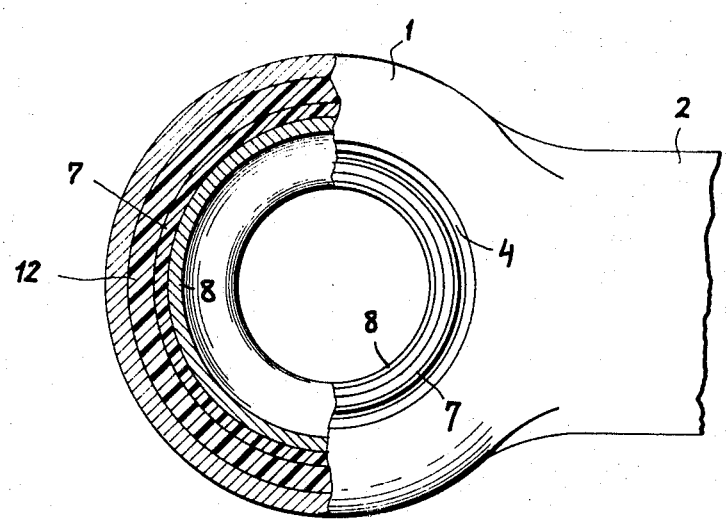

The invention will be described in greater detail hereinafter with reference to the accompanying drawing in which:

FIG. 1 is a side-elevational view, partly in axial section, of a ball joint according to the invention; and FIG. 2 is an end view of the joint taken partly in cross-section on the line II—II of FIG. 1.

The joint shown in the drawing comprises a female coupling element having a metallic shell 1 of generally toroidal shape and a liner consisting of two relatively elastic symmetrical flank portions 3, 4 and a relatively inelastic central ring portion 12 therebetween. Flank portions 3, 4 may consist of a wear-resistant synthetic resin, such as polyurethane, whereas central portion 12 may be made of phenol formaldehyde or some other condensation product of anhydrous formaldehyde.

An associated male coupling element consists of several (here two) tightly nested tubes 7, 8 extending axially through the open ends of the shell 1. These tubes have a spherical bulge 9 which conforms to the spherically concave recess defined by the inner surface of the composite liner 3, 12, 4. An extremity of tube nest 7, 8 outside shell 1 is embraced by the enlarged free end 5 of an annular extension 6 of liner portion 3, this end being clamped by a spring clip 10 against the outer tube 7 so as to tend to keep the ball member 7, 8 centered on the axis O of the socket.

As shown in FIG. 2, socket 1 is integral with an arm 2 which may be a crank swingable about a remote fulcrum, e.g. under the control of a worm on a vehicular steering column as is well known per se; a rod 14, which may be part of an associated steering linkage, has been illustrated diagrammatically in FIG. 1 as firmly secured to the tubes 7, 8.

A protective ring 13 of cellular or foam plastic (e.g. polyurethane) spacedly surrounds the end of tubes 7, 8 gripped by the sleeve 5, 6.

In making the joint in FIGS. 1 and 2, I first introduce the outer tube 7 into the socket 1, 3, 4, 12 (e.g. from the right-hand end as viewed in FIG. 1) and then expand this tube from within, as indicated by the arrows, against the surface of the socket to form the bulge 9; this expansion may be carried out with the aid of a spherically rounded hammerhead or similar tool. Next, the inner tube 8 is inserted and is then expanded in the same manner.

It will generally be desirable, although not necessary in all cases, to make the outer tube 7 of a more readily deformable material, such as a synthetic resin, in order to insure the obtention of a convex surface closely corresponding to the concavity of the socket, the inner tube 8 being then made from a less readily deformable material (e.g. metal) which needs only to give the necessary backing to the outer tube without being of geometrically precise spherical configuration. If both tubes are made of metal, the outer one advantageously consists of stainless steel while the inner one may be made from ordinary steel; in this case, the outer tube may be somewhat thinner to increase its deformability for the reasons set forth above. Naturally, the spherical contact surfaces of the male and female coupling elements should in any case consist of a material affording a low coefficient of relative friction.

It will be noted that parts of the liner portions 3, 4 and the flanges of the unitary shell 1 surround the tube nest 7, 8 with a certain radial clearance to permit a limited swing away from the axis O in any direction. FIG. 1 also shows that the open socket ends formed by these flanges have a radius which is substantially smaller than that of the spherical bulge 9.

I claim:
1. A ball joint comprising a female coupling element with a unitary metallic shell and a plastic liner having at least one open end centered on an axis, said shell and liner being part of a wall forming an axially extending bore with a spherically concave recess in line with said open end, the latter having a radius substantially smaller than that of said recess, said liner forming a peripheral wall surface for said recess, and a male coupling element including a plurality of tightly nested tubes normally centered on said axis with limited mobility relative thereto, said tubes having a bulging portion contacting said inner peripheral wall surface and conforming to the peripheral curvature thereof.

2. A ball joint as defined in claim 1 wherein said tubes include an outer tube of more readily deformable material and an inner tube of less readily deformable material.

3. A ball joint as defined in claim 2 wherein said outer tube consists of synthetic resin and said inner tube consists of metal.

4. A ball joint as defined in claim 1 wherein said outer tube consists of stainless steel.

5. A ball joint comprising a female coupling element including a metallic shell with a plastic liner forming an inner peripheral wall around a spherically concave bore centered on an axis and provided with at least one open end, and a male coupling element including a plurality of tightly nested tubes normally centered on said axis, said tubes having a bulging portion contacting said inner peripheral wall and conforming to the spherical curvature of said bore, said linear consisting of two relatively elastic symmetrical flank portions and a relatively inelastic central ring portion between said flank portions.

6. A ball joint comprising a female coupling element including a metallic shell with a plastic liner forming an inner peripheral wall around a spherically concave bore centered on an axis and provided with at least one open end, and a male coupling element including a plurality of tightly nested tubes normally centered on said axis, said tubes having a bulging portion contacting said inner peripheral wall and conforming to the spherical curvature of said bore, said linear being provided with an integral annular extension projecting axially from said shell and forming a flexible sleeve around said tubes, said sleeve having a free end spaced from said shell and gripping the outermost tube under radial clamping pressure.

7. A ball joint as defined in claim 6 wherein said sleeve is provided with a contractile spring clip encircling said free end.

8. A ball joint as defined in claim 6, further comprising a protective ring in said shell spacedly surrounding said sleeve.

References Cited

UNITED STATES PATENTS

| | | |
|---|---|---|
| 190,733 | 5/1877 | Blood. |
| 2,891,826 | 6/1959 | Josephson et al. _____ 308—72 |
| 2,912,267 | 11/1959 | Latzen. |
| 3,086,792 | 4/1963 | Schultz _____ 287—88 XR |
| 3,376,633 | 4/1968 | Wesley. |

FOREIGN PATENTS 777,002  6/1957  Great Britain.

REINALDO P. MACHADO, Primary Examiner

A. V. KUNDRAT, Assistant Examiner

U.S. Cl. X.R.

308—72